(12) United States Patent
Chen et al.

(10) Patent No.: US 11,567,162 B2
(45) Date of Patent: Jan. 31, 2023

(54) DEVICE AND METHOD FOR ESTIMATING DIRECTION OF ARRIVAL

(71) Applicant: Huawei Technologies Co., Ltd., Shenzhen (CN)

(72) Inventors: Kainan Chen, Munich (DE); Jürgen Geiger, Munich (DE); Mohammad Taghizadeh, Munich (DE); Peter Grosche, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 545 days.

(21) Appl. No.: 16/664,373

(22) Filed: Oct. 25, 2019

(65) Prior Publication Data

US 2020/0057132 A1 Feb. 20, 2020

Related U.S. Application Data

(63) Continuation of application No. PCT/EP2017/059732, filed on Apr. 25, 2017.

(51) Int. Cl.
*G01S 3/808* (2006.01)
*G01S 3/80* (2006.01)
*H04R 3/00* (2006.01)
*G10L 17/00* (2013.01)

(52) U.S. Cl.
CPC .......... *G01S 3/8083* (2013.01); *G01S 3/8006* (2013.01); *G10L 17/00* (2013.01); *H04R 3/005* (2013.01)

(58) Field of Classification Search
CPC ..... G01S 3/8083; G01S 3/8006; G10L 17/00; H04R 3/005
See application file for complete search history.

(56) References Cited

FOREIGN PATENT DOCUMENTS

| CN | 104459607 A | 3/2015 |
|---|---|---|
| CN | 104914408 A | 9/2015 |
| CN | 106405501 A | 2/2017 |

(Continued)

OTHER PUBLICATIONS

Masahito Togame, stepwise phase difference restoration method for DAO estimation of multiple sources, 2008, IEICE Trans. Fundamentals, VOLERi-A, No. 11 (Year: 2008).*

(Continued)

*Primary Examiner* — Isam A Alsomiri
*Assistant Examiner* — Abdallah Abulaban
(74) *Attorney, Agent, or Firm* — Leydig, Voit & Mayer, Ltd.

(57) ABSTRACT

A device for estimating Direction of Arrival (DOA) of sound from Q≥1 sound sources is provided. The device is configured to obtain a phase difference matrix, which includes measured phase difference values, each of the measured phase difference values being a measured value of a phase difference between two microphone units for a frequency bin in a range of frequencies of the sound. The device is further configured to generate a replicated phase difference matrix by replicating the measured phase difference values to other potential sinusoidal periods, calculate a DOA value for each phase difference value in the replicated phase difference matrix, and determine, as Q DOA results, the Q most prominent peak values in a histogram generated based on the calculated DOA values.

18 Claims, 13 Drawing Sheets

(56) References Cited

FOREIGN PATENT DOCUMENTS

WO    WO-2010048620 A1 *    4/2010    ............ G01S 3/8006

OTHER PUBLICATIONS

Togami et al., "Stepwise Phase Difference Restoration Method for DOA Estimation of Multiple Sources," IEICE Trans. Fundamentals, vol. E91-A, No. 11, XP001517415, pp. 3269-3281, The Institute of Electronics, Information and Communication Engineers, Tokyo, Japan (Nov. 2008).

Krämer et al., "Presentation of an improved Phase Unwrapping Algorithm based on Kalman filters combined with local slope estimation," European Space Agency, Provided by the NASA Astrophysics Data System, pp. 253-260. (Mar. 1997).

Arberet et al., "A Robust Method to Count and Locate Audio Sources in a Multichannel Underdetermined Mixture," IEEE Transactions on Signal Processing, vol. 58, No. 1, pp. 121-133, Institute of Electrical and Electronics Engineers, New York, New York (Jan. 2010).

Lombard et al., "Multidimensional Localization of Multiple Sound Sources Using Averaged Directivity Patterns of Blind Source Separation Systems," ICASSP 2009, pp. 233-236, Institute of Electrical and Electronics Engineers, New York, New York (2009).

Itoh, "Analysis of the phase unwrapping algorithm," Applied Optics, vol. 21, No. 14, OSA Publishing (Jul. 15, 1982).

Amin et al., "Estimation of Direction of Arrival (DOA) Using Real-Time Array Signal Processing and Performance Analysis," IJCSNS International Journal of Computer Science and Network Security, vol. 10, No. 7, pp. 43-57 (Jul. 2010).

Dmochowski et al., "Direction of Arrival Estimation Using the Parameterized Spatial Correlation Matrix," IEEE Transactions on Audio, Speech, and Language Processing, vol. 15, No. 4, pp. 1327-1339, Institute of Electrical and Electronics Engineers, New York, New York (May 2007).

Nikunen et al., "Direction of Arrival Based Spatial Covariance Model for Blind Sound Source Separation," IEEE/ACM Transactions on Audio, Speech, and Language Processing, vol. 22, No. 3, pp. 727-739, Institute of Electrical and Electronics Engineers, New York, New York (Mar. 2014).

Nico et al., "Bayesian Approaches to Phase Unwrapping: Theoretical Study," IEEE Transactions on Signal Processing, vol. 48, No. 9, pp. 2545-2556, Institute of Electrical and Electronics Engineers, New York, New York (Sep. 2000).

Sukumar et al., "Phase Unwrapping with Kalman Filter based Denoising in Digital Holographic Interferometry," 2015 International Conference on Advances in Computing, Communications, and Informatics (ICACCI), pp. 2256-2260, Institute of Electrical and Electronics Engineers, New York, New York (2015).

Yan et al., "Weighted Kalman Filter Phase Unwrapping Algorithm Based on InSAR Image.," Engineering Review vol. 33, Issue 3, pp. 227-231 (2013).

Valin et al., "Robust Localization and Tracking of Simultaneous Moving Sound Sources Using Beamforming and Particle Filtering," vol. 55, Robotics and Autonomous Systems, pp. 216-228, Elsevier (2006).

Ihlefeld et al., "Effect of Source Spectrum on Sound Localization in an Everyday Reverberant Room," pp. 324-333, Acoustical Society of America (Jul. 2011).

Dibiase, "A High-Accuracy, Low-Latency Technique for Talker Localization in Reverberant Environments Using Microphone Arrays," pp. 1-122 (May 2000).

Dmochowski et al., "On Spatial Aliasing in Microphone Arrays," IEEE Transactions on Signal Processing, vol. 57, No. 4, pp. 1383-1395, Institute of Electrical and Electronics Engineers, New York, New York (Apr. 2009).

Reddy et al., "Unambiguous Speech DOA Estimation Under Spatial Aliasing Conditions," IEEE/ACM Transactions on Audio, Speech, and Language Processing, vol. 22, No. 12, pp. 2133-2145, Institute of Electrical and Electronics Engineers, New York, New York (Dec. 2014).

Amin et al., "Estimation of Direction of Arrival (DOA) Using Real-Time Array Signal Processing," 5th International Conference on Electrical and Computer Engineering, ICECE 2008, Dhaka, Bangladesh, pp. 422-427, Institute of Electrical and Electronics Engineers, New York, New York (Dec. 20-22, 2008).

Schmidt, "Multiple Emitter Location and Signal Parameter Estimation," IEEE Transactions on Antennas and Propagation, vol. AP-34, No. 3, pp. 276-280, Institute of Electrical and Electronics Engineers, New York, New York (Mar. 1986).

Roy et al., "ESPRIT-Estimation of Signal Parameters via Rotational Invariance Techniques," IEEE Transactions on Acoustics, Speech, and Signal Processing, vol. 37, No. 7, pp. 984-995, Institute of Electrical and Electronics Engineers, New York, New York (Jul. 1989).

Reddy et al., "Direction-of-Arrival Estimation of Speech Sources Under Aliasing Conditions," IEEE International Conference on Acoustics, Speech, and Signal Processing (ICASSP), pp. 1-5, Institute of Electrical and Electronics Engineers, New York, New York (2015).

Benesty, "Adaptive Eigenvalue Decomposition Algorithm for Passive Acoustic Source Localization," pp. 384-391, Acoustical Society of America (Jan. 2000).

Buchner et al., "Simultaneous Localization of Multiple Sound Sources Using Blind Adaptive MIMO Filtering," IEEE International Conference on Acoustics, Speech, and Signal Processing (ICASSP), pp. 97-100, Institute of Electrical and Electronics Engineers, New York, New York (2005).

Lombard et al., "TDOA Estimation for Multiple Sound Sources in Noisy and Reverberant Environments Using Broadband Independent Component Analysis," IEEE Transactions on Audio, Speech, and Language Processing, vol. 19, No. 6, pp. 1490-1503, Institute of Electrical and Electronics Engineers, New York, New York (Aug. 2011).

Nesta et al., "Cooperative Wiener-ICA for Source Localization and Separation by Distributed Microphone Arrays," IEEE International Conference on Acoustics, Speech, and Signal Processing (ICASSP), Institute of Electrical and Electronics Engineers, New York, New York (2010).

Navarro et al., "Fast Two-Dimensional Simultaneous Phase Unwrapping and Low-pass Filtering," Optics Express, vol. 20, No. 3, pp. 1-6, Optical Society America (Jan. 2012).

Martin, "Noise Power Spectral Density Estimation Based on Optimal Smoothing and Minimum Statistics," IEEE Transactions on Speech and Audio Processing, vol. 9, No. 5, pp. 504-512 (Jul. 2001).

Cooke et al., "An Audio-Visual Corpus for Speech Perception and Automatic Speech Recognition (L)," J. Acoust. Soc. Am., vol. 120, No. 5, pp. 2421-2424, Acoustical Society of America (Nov. 2006).

Gdeisat et al., "One-Dimensional Phase Unwrapping Problem," pp. 1-11 (2011).

Teutsch et al.,"Wavefield Decomposition Using Microphone Arrays and Its Application to Acoustic Scene Analysis," pp. 1-279 (2005).

Shin et al., "Reduced-Complexity Maximum Likelihood Direction-of-Arrival Estimation Based on Spatial Aliasing," IEEE Transactions on Signal Processing, vol. 62, No. 24, pp. 6568-6581, Institute of Electrical and Electronics Engineers, New York, New York (Dec. 15, 2014).

Tang et al., "Aliasing-Free Wideband Beamforming Using Sparse Signal Representation," IEEE Transactions on Signal Processing, vol. 59, No. 7, pp. 3464-3469, Institute of Electrical and Electronics Engineers, New York, New York (Jul. 2011).

Liu et al., "Wideband Beamforming Concepts and Techniques," A John Wiley and Sons, Ltd., Publication (2010).

Lombard et al., "Localization of Multiple Independent Sound Sources in Adverse Environments," pp. 1-263 (2012).

Backus, "The Acoustical Foundations of Music, Chapter 2: Sound," Second Edition, pp. 16-25, W. W. Norton and Company (1977).

(56) References Cited

OTHER PUBLICATIONS

Van Trees, "Detection, Estimation, and Modulation Theory, Optimum Array Processing, 2.4: Uniformly Weighted Linear Arrays," John Wiley and Sons (2002).
Mh acoustics LLC, "www.mhacoustics.com," date retrieved (Jan. 17, 2020).
Chen et al.,"Robust Audio Localization with Phase Unwrapping," ICASSP 2017, pp. 471-475, Institute of Electrical and Electronics Engineers, New York, New York (2017).
Blauert, "Spatial Hearing—The Psychophysics of Human Sound Localization, 2.1: Localization and Localization Blur," pp. 37-50, The MIT Press (1983).

* cited by examiner

DEVICE AND METHOD FOR ESTIMATING DIRECTION OF ARRIVAL

CROSS-REFERENCE TO RELATED APPLICATIONS

This application is a continuation of International Application No. PCT/EP2017/059732 filed on Apr. 25, 2017, the disclosure of which is hereby incorporated by reference in its entirety.

TECHNICAL FIELD

Embodiments of the present invention relate to a device, to a corresponding method, and to an apparatus for estimating Direction of Arrival (DOA) from $Q \geq 1$ sound sources. In particular, the device and method perform a post-processing on a phase difference matrix, which is obtained, for instance, from a sound receiver adapted to receive the sound from the sound sources.

BACKGROUND

Most multichannel sound source DOA estimation algorithms suffer from spatial aliasing problems. As a consequence of spatial aliasing, interchannel phase differences are wrapped beyond the spatial aliasing frequency. A common solution for addressing this problem is to adjust a distance between microphones or microphone arrays receiving the sound generated by the sound sources, in order to obtain a suitable minimum aliasing frequency. Further, to then take only the frequency band below that minimum aliasing frequency for localizing the sound sources.

A conventional method for localizing sound sources using microphones is to estimate a Time Difference of Arrival (TDOA, $\Delta t$) from each sound source to the microphones. For narrow band localization algorithms, the TDOA can be estimated from the interchannel phase differences $\mu_i$ in each frequency band. The relationship between these phase differences and the TDOA is $$\mu_i = 2\pi f_i \Delta t \quad (1)$$

where $f_i$ denotes the frequency of the narrowband. For a far-field assumption, DOA can further be estimated from the TDOA. The relationship between the phase differences $\mu_i$ and DOA, as expressed by an angle $\theta$ of the sound source to the microphones, is shown in the below equation (2). In this equation, c denotes the speed of sound in the recording environment, and $\Delta d$ denotes a distance between the microphones.

$$\mu_i = \frac{2\pi f_i |\sin\theta| \Delta d}{c} \quad (2)$$

Conventional algorithms estimate narrowband DOA by estimating a phase difference $\widehat{\mu}_i$. However, when $\mu_i > 2\pi$, $\widehat{\mu}_i$ will be wrapped into $[-\pi, \pi]$, which can be seen in FIG. 13 (on the left-hand side) for the higher frequencies. The correct, frequency-dependent phase differences are indicated here in FIG. 13 by the straight bold line, whereas incorrect, wrapped, frequency-dependent phase differences are shown along the jagged line. As a result, the estimated DOA will be wrong, which can also be seen in FIG. 13 (on the right-hand side). Here, the correct (frequency-independent) DOA is indicated by the horizontal bold line, whereas the incorrect (frequency-dependent) DOAs are indicated along the jagged line. The illustrated problem is the so-called spatial aliasing problem.

The frequency at the boundary of the spatial aliasing problem is called the aliasing frequency $f_a$. From the below equation (3), it can be seen that $f_a$ is related to the angle $\theta$, which is unfortunately unknown, so that the wrapped phase difference matrix $\widehat{\mu}_i$, cannot directly be unwrapped for frequencies above $f_a$.

The minimum aliasing frequency for a certain scenario is defined as $f_{a_0}$, wherein $$f_a = \frac{c}{2|\sin\theta|\Delta d}, f_{a_0} = \frac{c}{2\Delta d} \quad (3)$$

Conventionally, when a sound source is broad in frequency band, a Discrete Fourier transform (DFT) is applied. Then, the narrowband localization algorithm is repeated on each frequency. Thus, a "raw" phase difference vector is obtained for a single sound source scenario, and a "raw" phase difference matrix is obtained for a multisource scenario, which is defined as $\mu_0$. This phase difference matrix includes correct phase difference values only at $f_i \leq f_{a_0}$.

Therefore, conventionally only the lower frequency bands ($f_i \leq f_{a_0}$) of the sound are taken into account for the localization, in order to avoid the spatial aliasing problem. This is a significant disadvantage of the conventional algorithms.

SUMMARY

In view of the above-mentioned problems and disadvantages, embodiments of the present invention aim at improving devices and methods that operate based on conventional localization algorithms, that is, for estimating DOA. Embodiments of the invention have the object of utilizing also higher frequency bands $f_i > f_{a_0}$ of sound for estimating DOA, especially for multichannel sound sources. Embodiments of the invention thereby aim towards a device and method enabling a more robust and accurate estimation of DOA and localization of sound sources. Specifically, when a distance between microphones or microphone arrays is large, embodiments of the invention improve over conventional devices and methods.

An object of embodiments of the invention is achieved by the solution provided in the description which follows.

In particular, embodiments of the invention use a replication of phase difference values in the phase difference matrix $\mu_0$, in order to reduce the impact of the spatial aliasing problem for single as well as multi sound source localization, and to apply further post-processing that can make the technique more robust, e.g., in noisy scenarios. In particular, embodiments of the invention reconstruct the phase difference matrix $\mu_0$ by certain relationships between its phase difference values, utilizing the higher frequency bands $f_i > f_{a_0}$, for a more robust localization.

A first aspect of embodiments of the invention provide a device for estimating DOA of sound from $Q \geq 1$ sound sources, the device being configured to obtain a phase difference matrix, which includes measured phase difference values, each of the measured phase difference values being a measured value of a phase difference between two microphone units for a frequency bin in a range of frequencies of the sound, generate a replicated phase difference matrix by replicating the measured phase difference values to other potential sinusoidal periods, calculate a DOA value for each phase difference value in the replicated phase difference matrix, and determine, as Q DOA results, the Q most prominent peak values in a histogram generated based on the calculated DOA values.

Generating the replicated phase difference matrix enables a localization based on not only low frequencies but also high frequencies of wide-band sound sources, for greater robustness and accuracy, i.e. an improved estimation of the DOA. Specifically, higher frequency bands $f_i > f_{a_0}$ are utilized as well. Notably, if there is only one sound source, i.e. if Q=1, the sound difference matrix is essentially a phase difference vector (matrix with one column). Basically, in the step of phase difference replication, the measured phase difference for a certain frequency or frequency band is unwrapped to a candidate set consisting of one or more other possible phase difference values which each differ from the measured phase difference value by an integer multiple of $2\pi$ (or 360°) (i.e., which lie in other sinusoidal periods). The replicated phase difference matrix will thus include all the correctly unwrapped phase differences (one correctly unwrapped phase difference for each measured phase difference) as well as a set of erroneously unwrapped phase differences. However, the correctly unwrapped phase differences will be more prominent in a histogram, and can thereby be identified.

In addition, selecting the DOA results based on most prominent peaks in a histogram is both efficient and accurate, and allows further post-processing steps that additionally improve the DOA estimation.

A frequency bin may be a subrange of the range of frequencies of the sound, or may be a single frequency in the range of frequencies of the sound.

In an implementation form of the first aspect, the device is configured to generate the replicated phase difference matrix by replicating the measured phase difference values based on the minimum aliasing frequency defined by $$f_{a0} = \frac{c}{2\Delta d}$$

wherein $\Delta d$ denotes a distance between the two microphone units and c is the speed of the sound.

Thereby, all of the potential aliasing frequencies are covered for the replication. Below the minimum aliasing frequency $f_{a0}$, phase differences cannot be wrapped, only above $f_{a0}$.

In a further implementation form of the first aspect, the measured phase difference values in the phase difference matrix are wrapped into $[-\pi, \pi]$, and the device is configured to generate the replicated phase difference matrix according to $$C = \left\lceil \frac{f_i - f_{a_0}}{2 f_{a_0}} \right\rceil$$

$$C_s = (-C, -C+1, \ldots, 0, \ldots, C)$$

$$\mu(i, j) = \mu_0(i) + 2\pi C_s(j)$$

$$i = 1, \ldots N; j = 1, \ldots (2C+1)$$

wherein $\mu_0$ denotes the phase difference matrix, $\mu$ denotes the replicated phase difference matrix, i is a frequency bin index corresponding to frequency $f_i$, j is a replication index, and $\lceil * \rceil$ denotes the ceiling function.

In this manner, a replicated phase difference matrix can be generated efficiently, which covers all of the potentially correct sinusoidal periods of interchannel phase differences.

In a further implementation form of the first aspect, the device is configured to calculate the DOA values based on the formula $$\theta(i, j) = \arcsin \frac{c\mu(i, j)}{2\pi f \Delta d}$$

wherein $\theta$ (i,j) denotes the DOA value for frequency bin index i and replication index j, $\mu$ denotes the replicated phase difference matrix and $\Delta d$ denotes a distance between the two microphone units.

As explained above, the replicated phase difference matrix contains for each frequency bin a set of one or more candidate values of the correct phase difference for that frequency bin. Transforming each element of the replicated phase difference matrix into a DOA value generates a DOA matrix which contains for each frequency bin a set of one or more candidate values of the correct DOA for that frequency bin, including the actual correct DOA value.

In a further implementation form of the first aspect, the device is configured to generate a first histogram from the calculated DOA values, and determine, as the Q DOA results, the Q most prominent peak values in the first histogram.

This implementation form is particularly advantageous if the sound sources provide broadband signals and/or if the scenario is clean, i.e. if noise in the scenario is low. The selection of the peaks from the first histogram is a fast and simple way to obtain the DOA results, and leads to more robust and accurate results than using only low frequencies.

In a further implementation form of the first aspect, the device is configured to generate a first histogram from the calculated DOA values, select, as Q+q DOA candidates, the Q+q most prominent peak values in the first histogram, wherein preferably q=2, generate a second histogram based on the selected Q+q DOA candidates, and determine, as the Q DOA results, the Q most prominent peak values in the second histogram.

This implementation form is particularly advantageous if the scenario is noisy and/or if some of the sound sources are weak. In this case, these weak sound sources may contribute peaks to the first histogram which are likely to be less prominent than peaks resulting from spatial aliasing. Accordingly, the selection of q additional peaks, which are taken as candidates from the first histogram, makes the DOA estimation even more robust and accurate.

In a further implementation form of the first aspect, the device is configured to remove complex calculated DOA values before generating the first histogram.

Thereby, the DOA estimation becomes less complex and has a high accuracy. DOA values are complex only if the interchannel phase differences are in the wrong sinusoidal periods.

In a further implementation form of the first aspect, for generating the second histogram, the device is configured to determine, for each selected DOA candidate, its related DOA values from the calculated DOA values, generate third histograms from each selected DOA candidate and its related DOA values, and generate the second histogram by merging the third histograms of all selected DOA candidates.

By selecting the related DOA values for each candidate, and analyzing the third histograms individually, the interference between sources is reduced. Therefore the accuracy of the DOA estimation is further improved.

In a further implementation form of the first aspect, the device is configured to merge the third histograms of all selected DOA candidates to generate the second histogram by, for each histogram index, using the maximum value from all the third histograms as the value of the second histogram for that histogram index.

After merging, the correct peaks are clearer compared to the second histogram. This implementation of the merging of the histograms therefore leads to the desired result of an accurate and robust DOA estimation. Using the mean for merging instead of maximum would lead to error accumulation across the different histograms. The merging rule based on the maximum does not have this problem.

In a further implementation form of the first aspect, the device is configured to determine the related DOA values of a DOA candidate by determining, as its related phase difference values, the phase difference values in the replicated phase difference matrix that are in supposed correct sinusoidal periods, and calculating its related DOA values from its related phase difference values.

Thereby, values corresponding to incorrect sinusoidal periods are removed. A supposed correct sinusoidal period is that sinusoidal period, which would be the result of unwrapping based on the aliasing frequency that is determined based on the DOA of the candidate peak. In this way of the determination, the height of the peak will be conserved in the third histogram, if the peak is correct.

In a further implementation form of the first aspect, the device is configured to apply a soft mask to the peak values in each of the third histograms, before merging the third histograms into the second histogram, wherein the soft mask is designed as a peak filter with a smaller width at a DOA of 0° and larger widths at DOAs of ±90°.

The soft masking of the peak values improves the accuracy of the peaks selected from the third histogram as DOA results. Theoretically, the widths of the aliasing peaks are large whereas the widths of the correct peaks are narrow at 0° and the widths increase when the peaks are getting closer to ±90°. Therefore using the soft-mask in this way can help to detect the correct peaks more reliably.

In a further implementation for of the first aspect, the device is configured to apply a low-pass filter to the second histogram, before determining the Q DOA results, preferably a Gaussian filter with a standard deviation σ according to $$\sigma = \arccos\left(1 - \frac{c}{f_s \Delta d}\right)$$

wherein $f_s$ denotes the sampling rate.

By use of such a Gaussian filter, the height of wide and narrow peaks can be balanced, leading to better estimation results. This filter can help to sharpen the wide correct peaks closer to ±90°, and flatten the narrow and sharp peaks around 0°.

In a further implementation form of the first aspect, each microphone unit includes an array of one or more microphones, and the one or more measured phase difference values of the phase difference matrix have been obtained from measured phase differences between the one or more microphones of one of the microphone units and the one or more microphones of the other one of the microphone units.

A second aspect of embodiments of the invention provide an apparatus for determining DOA of sound from Q≥1 sound sources, the apparatus comprising a device according the first aspect as such or any of its implementation forms, and a sound receiver including the two microphone units, which is configured to receive the sound, generate the phase difference matrix, and provide the phase difference matrix to the device.

The apparatus of the second aspect achieves all the advantages and effects of the device of the first aspect and its implementation forms, respectively.

A third aspect of embodiments of the invention provide a method of estimating DOA of sound from Q≥1 sound sources, the method comprising obtaining a phase difference matrix, which includes measured phase difference values, each of the measured phase difference values being a measured value of a phase difference between two microphone units for a frequency bin in a range of frequencies of the sound, generating a replicated phase difference matrix by replicating the measured phase difference values to other potential sinusoidal periods, calculating a DOA value for each phase difference value in the replicated phase difference matrix, and determining, as Q DOA results, the Q most prominent peak values in a histogram generated based on the calculated DOA values.

The method of the third aspect can be provided with implementation forms adding further method steps, which correspond to the actions taken by the device according to the implementation forms of the first aspect.

Accordingly, the method of the third aspect achieves all advantages and effects of the device of the first aspect and its implementation forms, respectively.

It will be noted that all devices, elements, units and means described in the present application could be implemented in software or hardware elements or any combination thereof. All steps which are performed by the various entities described in the present application as well as the functionalities described to be performed by the various entities are intended to mean that the respective entity is adapted to or configured to perform the respective steps and functionalities.

Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of embodiments of the present invention will be explained in the following description of specific embodiments in relation to the enclosed drawings, in which.

DETAILED DESCRIPTION OF THE EMBODIMENTS

Figure 1:
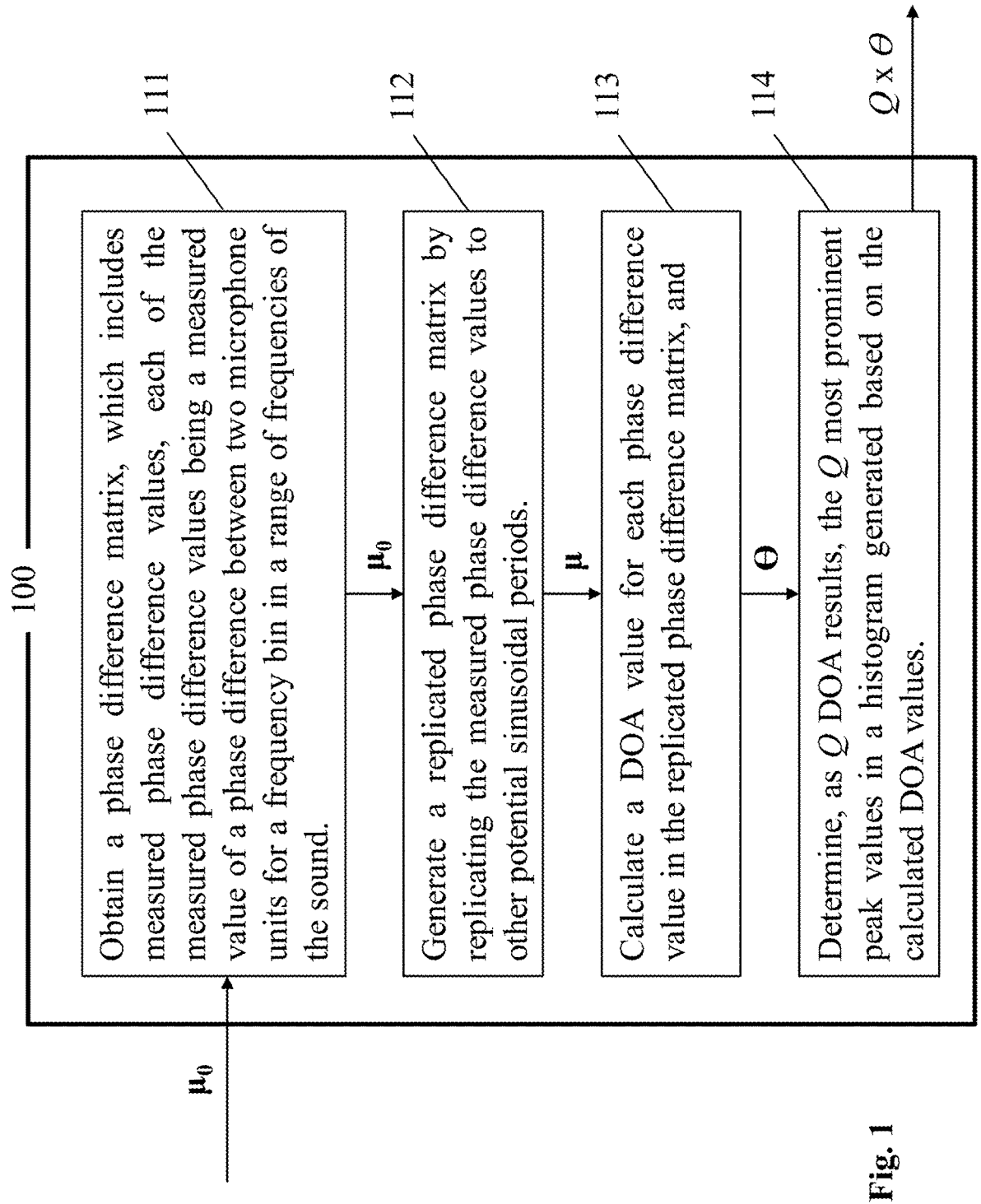
FIG. 1 shows a device and a method according to embodiments of the invention.
Figure 2:
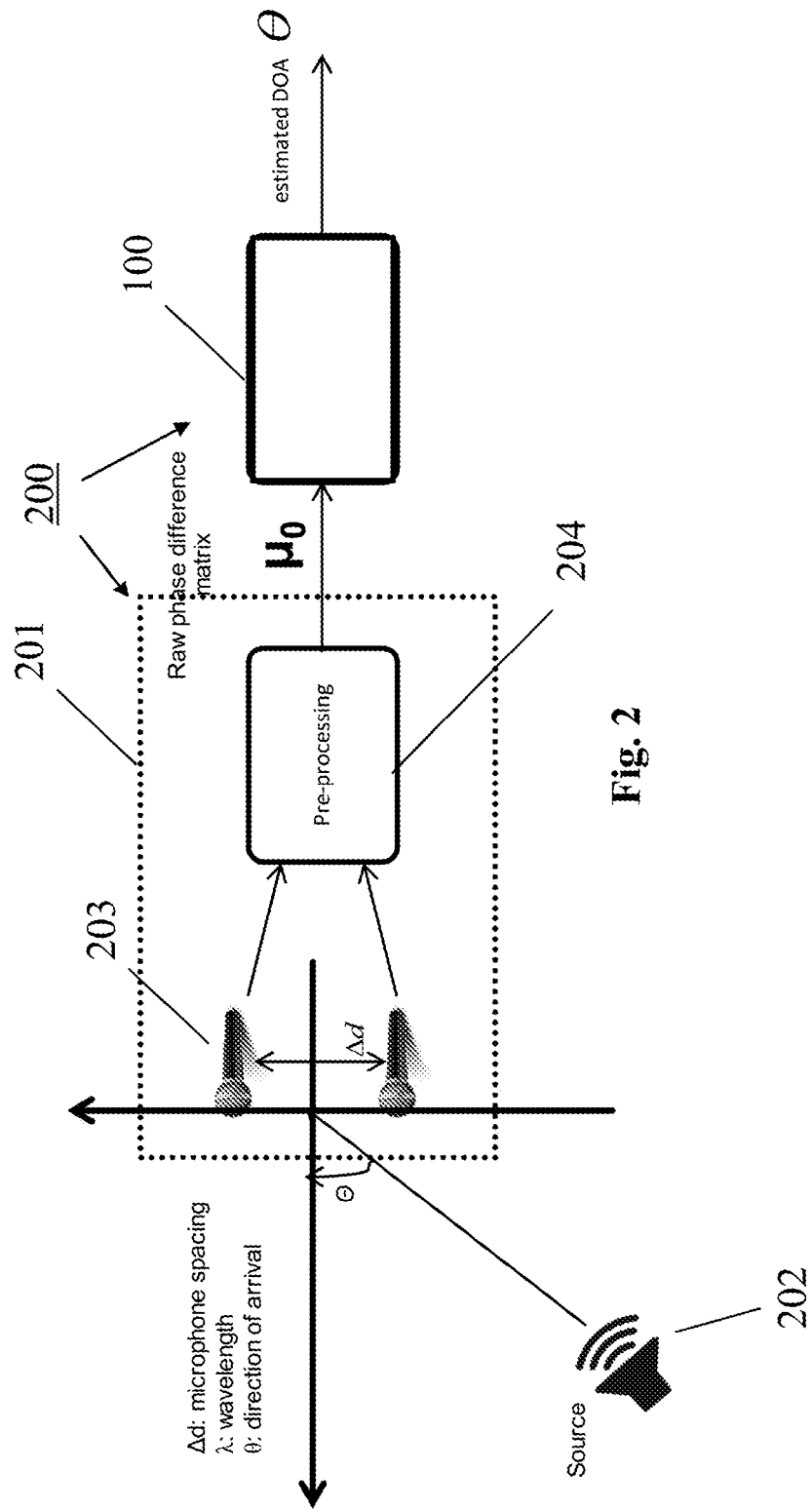
FIG. 2 shows a device and an apparatus according to embodiments of the invention.

FIG. 1 shows a device 100 according to an embodiment of the invention, which is configured for estimating DOA of sound from $Q \geq 1$ sound sources 202. FIG. 2 shows a specific scenario, in which the device 100 may be used. Namely, the device 100 may be part of an apparatus 200 according to another embodiment of the invention for determining the DOA. As shown, this apparatus 200 may also include a sound receiver 201 for receiving the sound from the sound sources 202 (here one sound source 202 is shown, i.e. Q=1). Notably, the device 100 may also be separate from, and for example connected to, such a sound receiver 201. The sound receiver 201 may include microphones or microphone arrays 203 and may include a pre-processing unit 204.

The device 100 of FIG. 1 is configured to obtain a phase difference matrix $\mu_0$, which includes measured phase difference values. Each of the measured phase difference values is a measured value of a phase difference between the two microphone units 203 for a frequency bin in a range of frequencies of the sound. The device 100 may for instance obtain the phase difference matrix from the sound receiver 201, particularly the pre-processing unit 204, which transforms the sound recorded by the microphones 203 into the phase difference matrix $\mu_0$.

The device 100 is further configured to generate a replicated phase difference matrix $\mu$ by replicating the measured phase difference values in the obtained phase difference matrix $\mu_0$ to other potential sinusoidal periods.

Then, the device 100 is configured to calculate a DOA value for each phase difference value in the replicated phase difference matrix $\mu$, i.e. it calculate a DOA matrix $\theta$. Finally, the device 100 is configured to determine, as Q DOA results, the Q most prominent peak values in a histogram generated based on the calculated DOA values $\theta$.

The device 100 is thereby configured to carry out a method according to an embodiment of the invention. As shown in FIG. 1, this method includes a step of obtaining 111 the phase difference matrix $\mu_0$, which includes measured phase difference values, each of the measured phase difference values being a measured value of a phase difference between two microphone units 203 for a frequency bin in a range of frequencies of the sound. It then includes a step of generating 112 a replicated phase difference matrix $\mu$ by replicating the measured phase difference values to other potential sinusoidal periods, a step of calculating 113 a DOA value for each phase difference value in the replicated phase difference matrix $\mu$, and finally a step of determining 114, as Q DOA results, the Q most prominent peak values in a histogram generated based on the calculated DOA values $\theta$.

The position of the device 100 in the sound source localization is shown in FIG. 2. The device 100 takes $\mu_0$ as an input, and outputs the at least one estimated DOA $\theta$. In FIG. 2, the device 100 is part of the apparatus 200, in which the sound receiver 201 includes the two microphone units 203 and is configured to receive the sound, generate the phase difference matrix $\mu_0$, and provide the phase difference matrix $\mu_0$ to the device 100.

Figure 3:
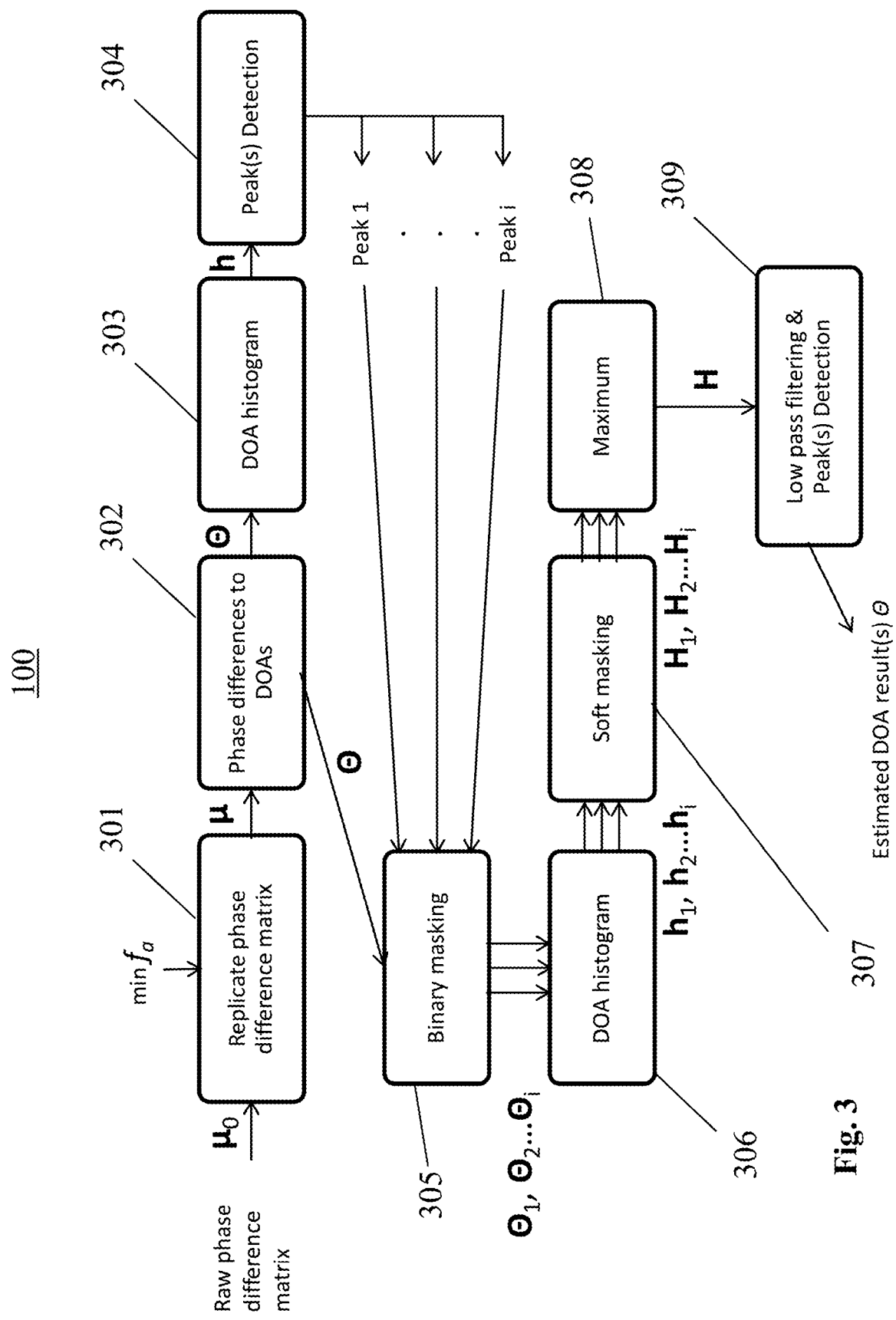
FIG. 3 shows a device according to an embodiment of the invention.

A more detailed overview of a device 100 according to an embodiment of the invention, which builds on the embodiment of the device 100 in FIG. 1, is shown in FIG. 3. Different functions of the device 100 are shown with respect to boxes 301 to 309, and can generally be categorized as a post-processing for phase difference matrix replication and refining.

In box 301, the phase difference matrix $\mu_0$ is obtained, and the replicated phase difference matrix $\mu$ is generated by replicating the measured phase difference values to other potential sinusoidal periods. In box 302, DOA values $\theta$ are calculated from the replicated phase difference matrix $\mu$. That is, a DOA value $\theta$ is calculated for each phase difference value in the replicated phase difference matrix $\mu$.

In box 303, a DOA histogram h (denoted as first histogram) is generated from the calculated DOA values $\theta$. In a simple implementation form of the device 100, the Q most prominent peak values in the first histogram h may be selected already at this point as Q DOA results. In an implementation form of the device 100, for improved robustness, more peaks in the histogram h are detected at box 304. In particular, here the Q+q most prominent peak values in the first histogram h may be detected as DOA candidates. q is preferably 2.

In box 305, a binary masking may be applied, wherein the binary masking takes as input the Q+q peaks detected at box 304 and the DOA values $\theta$ calculated at box 302. Thus, in box 305 particularly related DOA values $\theta_1, \theta_2 \ldots \theta_i$ are determined and output. At box 306, further histograms (denoted as third histograms) are produced from each selected DOA candidate and its related DOA values, and are output as $h_1, h_2 \ldots h_i$. At box 307, soft masking is applied to these histograms to output soft-masked histograms $H_1, H_2 \ldots H_i$. That is, a soft mask to the peak values is applied in each of the third histograms. At box 308, these histograms $H_1, H_2 \ldots H_i$ are then merged into one histogram H (denoted as second histogram) at box 308. The third histograms are particularly merged to generate the second histogram by, for each histogram index, using the maximum value from all the third histograms as the value of the second histogram for that histogram index (denoted by "maximum").

At box 309, an optional low-pass filtering is applied to the histogram H. Specifically, a Gaussian filter may be applied. Then, at box 309, the Q most prominent peak values in the second histogram are determined as the Q estimated DOA results $\theta$, and are output.

Figure 4:
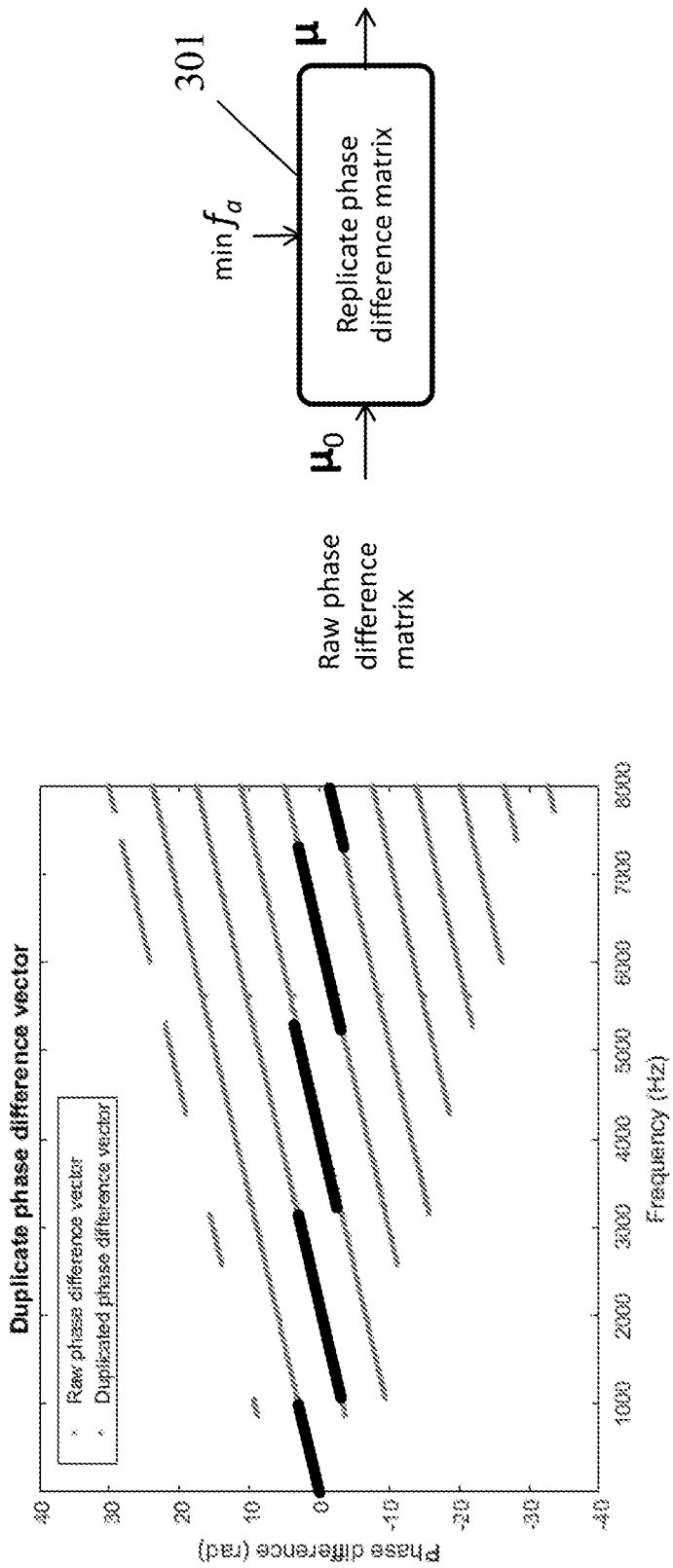
FIG. 4 shows technical details of a device according to an embodiment of the invention.

FIG. 4 shows in more detail the generation of the replicated phase difference matrix $\mu$ from the phase difference matrix $\mu_0$, as shown in box 301 of the device 100 of FIG. 3.

The purpose of this step is to obtain a (replicated) phase difference matrix $\mu$ in all of the potential sinusoidal periods. Frequency bands below $f_{a_0}$ should be in the correct sinusoidal period, so that $\mu_0$ is not replicated to other sinusoidal periods for such frequencies. Frequency bands in $[f_{a_0}, 3f_a]$ can maximally have 1 sinusoidal period out of the interval $[-\pi, \pi]$. Applying this rule to the higher frequency bands can be described as $$C = \left\lfloor \frac{f_i - f_a}{2 f_a} \right\rfloor \quad (4)$$

$$C_s = (-C, -C+1, \ldots, 0, \ldots, C)$$

$$\mu(i, j) = \mu_0(i) + 2\pi C_s(j)$$

$$i = 1, \ldots N; j = 1, \ldots (2C+1);$$

where $\lfloor * \rfloor$ denotes floor process, and $\mu$ is the replicated matrix. $\mu$ now contains $\mu_0$ in the correct sinusoidal period and contains some errors introduced from this step.

FIG. 4 shows specifically on the left-hand side the phase difference values in the replicated phase difference matrix $\mu$ in their dependence on the frequency. The bold lines in the graph denote the phase difference values, which are already contained in the phase difference matrix $\mu_0$. All other values in the graph are values replicated to other sinusoidal periods.

Figure 5:
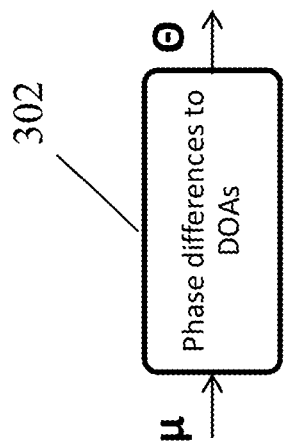
FIG. 5 shows technical details of a device according to an embodiment of the invention.
Figure 5:
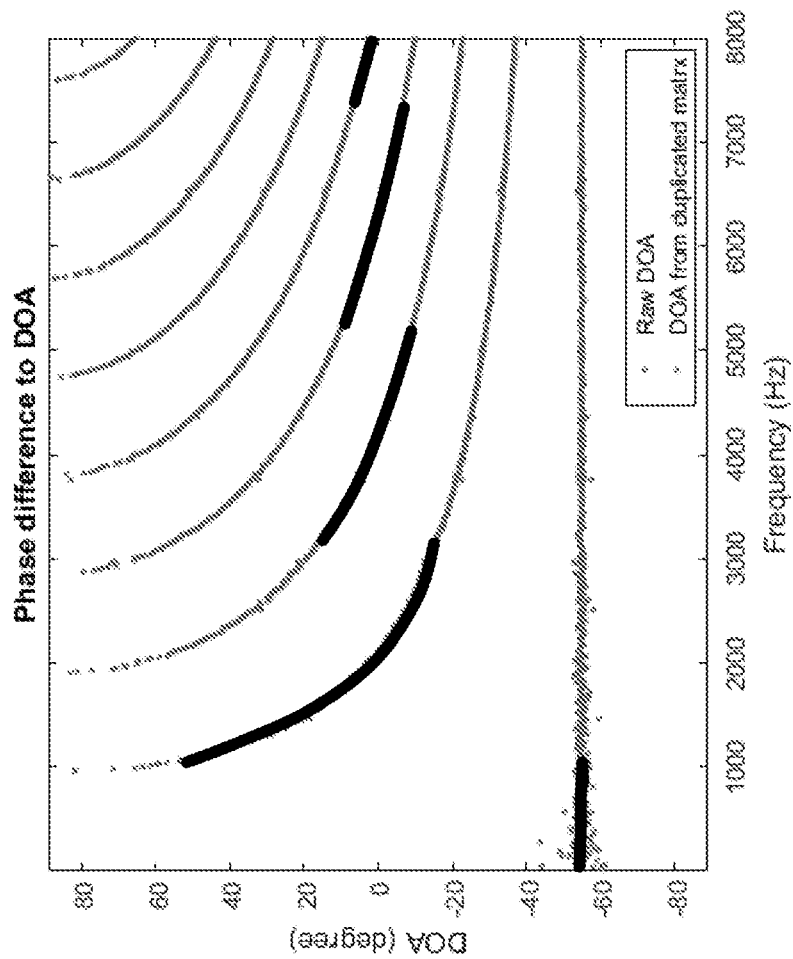

FIG. 5 shows in more detail the calculation of the matrix of DOA values $\theta$ from the replicated phase difference matrix $\mu$ at box 302.

Each phase difference value in the replicated phase difference matrix $\mu$ has a single corresponding DOA $\theta$. $\mu$ is transformed to DOA $\theta$ including these $\theta$ as $$\theta(i, j) = \arcsin \frac{c \mu(i, j)}{2 \pi f_i \Delta d} \quad (5)$$

$\theta(i,j)$ denotes the DOA value for frequency bin index i and replication index j, and $\Delta d$ denotes the distance between the two microphone units 203.

FIG. 5 shows specifically on the left-hand side the DOA values in their dependence on frequency. The DOA values along the bold lines correspond to the phase difference values in the phase difference matrix $\mu_0$, while the other values result from the replication step.

Now, $\ddot{\mu}$ may define the phase differences in the correct sinusoidal periods, and the transformed corresponding value of DOAs may be defined as $\dot{\theta}$. It is known that $\dot{\theta}$ is theoretically constant in clean (low noise) scenarios. This property can be expressed as $$\dot{\theta}(p) - \dot{\theta}(q) = \arcsin \frac{c \ddot{\mu}(p)}{2 \pi f_i \Delta d} - \arcsin \frac{c \ddot{\mu}(q)}{2 \pi f_i \Delta d} = 0 \quad (6)$$

By simplifying the above equation (6), the relationship of $\dot{\mu}$ between different frequencies can be determined as $$\frac{\ddot{\mu}(p)}{f_i} = \frac{\ddot{\mu}(q)}{f_i} \quad (7)$$

When the phase difference is in the wrong sinusoidal periods, $\ddot{\mu}(i) = \mu(i) + 2n\pi$, $(n \neq 0, n \in Z)$. The wrong estimated DOA is defined as $\ddot{\theta}(i)$. $\ddot{\theta}(i)$ is a complex number when the condition $$\frac{\mu(i)}{2\pi} + n > \frac{f_i \Delta d}{c} \quad (8)$$

is met. For this reason, all of the complex values are preferably removed from $\theta$.

Figure 6:
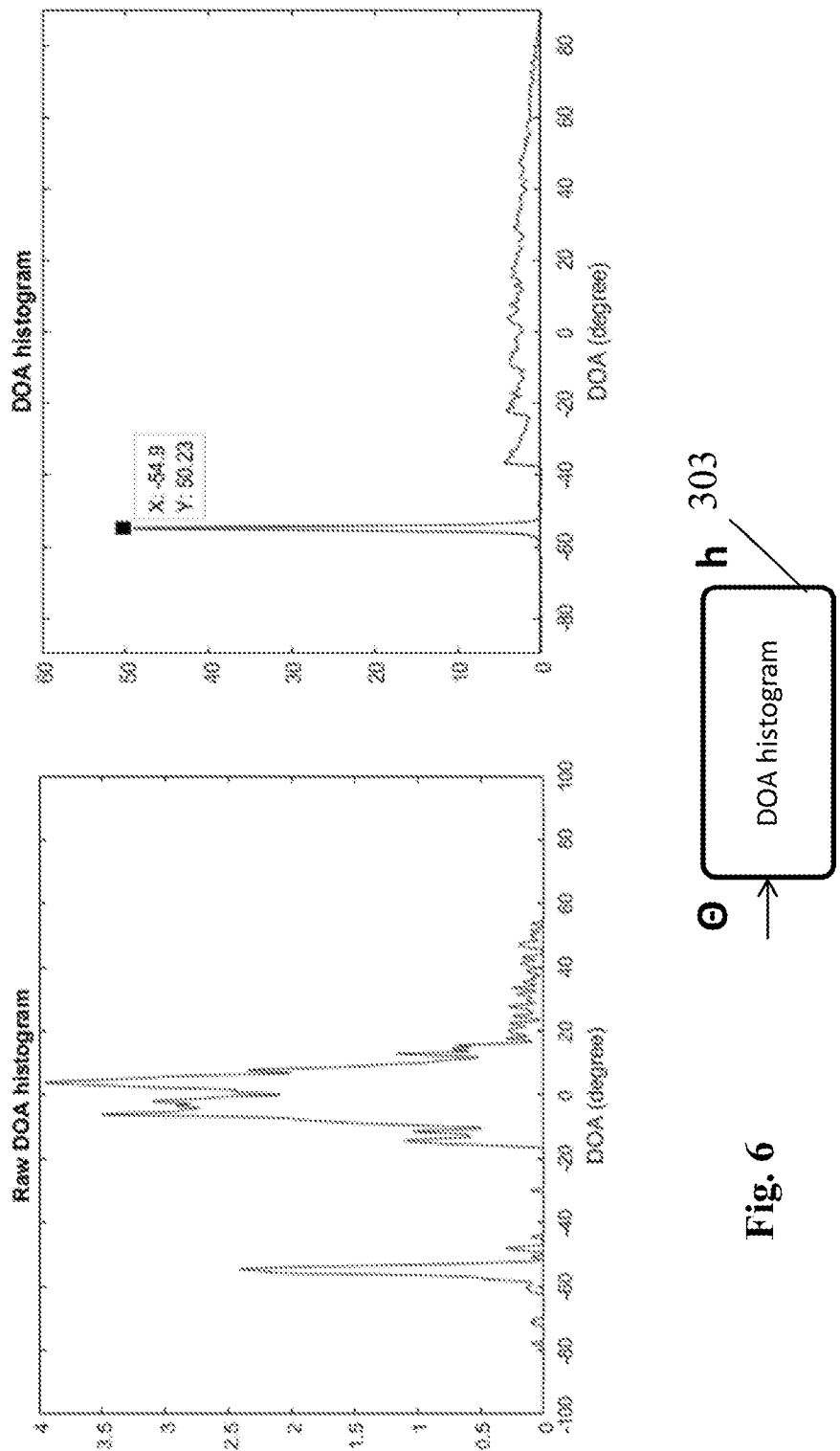
FIG. 6 shows a comparison between a histogram produced by a device according to an embodiment of the invention and a conventional histogram.

FIG. 6 shows in more detail, how then the remaining values are collected and transformed, at box 303, into the histogram h in [−90, 90] degree, wherein the length of h is denoted as $N_h$.

By taking the above equation (6) and the mentioned simplifications, the $\ddot{\theta}$ differences relationship between different frequencies is obtained as $$0 < \arcsin \sqrt{\frac{cn}{\Delta d} \left| \frac{1}{f_{i_p}} - \frac{1}{f_{i_q}} \right|} < \quad (9)$$

$$|\ddot{\theta}(p) - \ddot{\theta}(q)| < \arcsin \sqrt{\frac{c^2 n^2}{\Delta d^2} \left| \frac{1}{f_{i_p}^1} - \frac{1}{f_{i_q}^2} \right|},$$

$$p \neq q$$

This proves that $\ddot{\theta}$ is a monotonic variant along the frequency axis. Together with the constancy of $\dot{\theta}$, when $\theta$ is transformed into the histogram h, the amplitudes of the correct peaks are higher than the peaks from $\ddot{\theta}$.

FIG. 6 specifically compares a histogram of DOA values derived from the "raw" phase difference matrix $\mu_0$ (left-hand side) with the histogram h (here for Q=1) obtained from $\mu$. The advantageous effect of the invention is clearly observable, namely that the prominence of the correct peak (here at a DOA of −54.9°) is significantly pronounced.

If sound sources 202 are broadband signals, and the scenario is clean, the DOA results can be estimated by the positions of the peaks with the highest Q prominence. If the scenario is noisy, and/or some of the sound sources 202 are weak, the corresponding peaks may have less prominence than the peaks from $\ddot{\theta}$.

To make the estimation carried out by the device 100 even more robust, in such a case, Q'=Q+q peaks may be taken from the histogram h as DOA candidates (practically, q is taken as 2, but it may also be another integer value, like 3 or higher).

Figure 7:
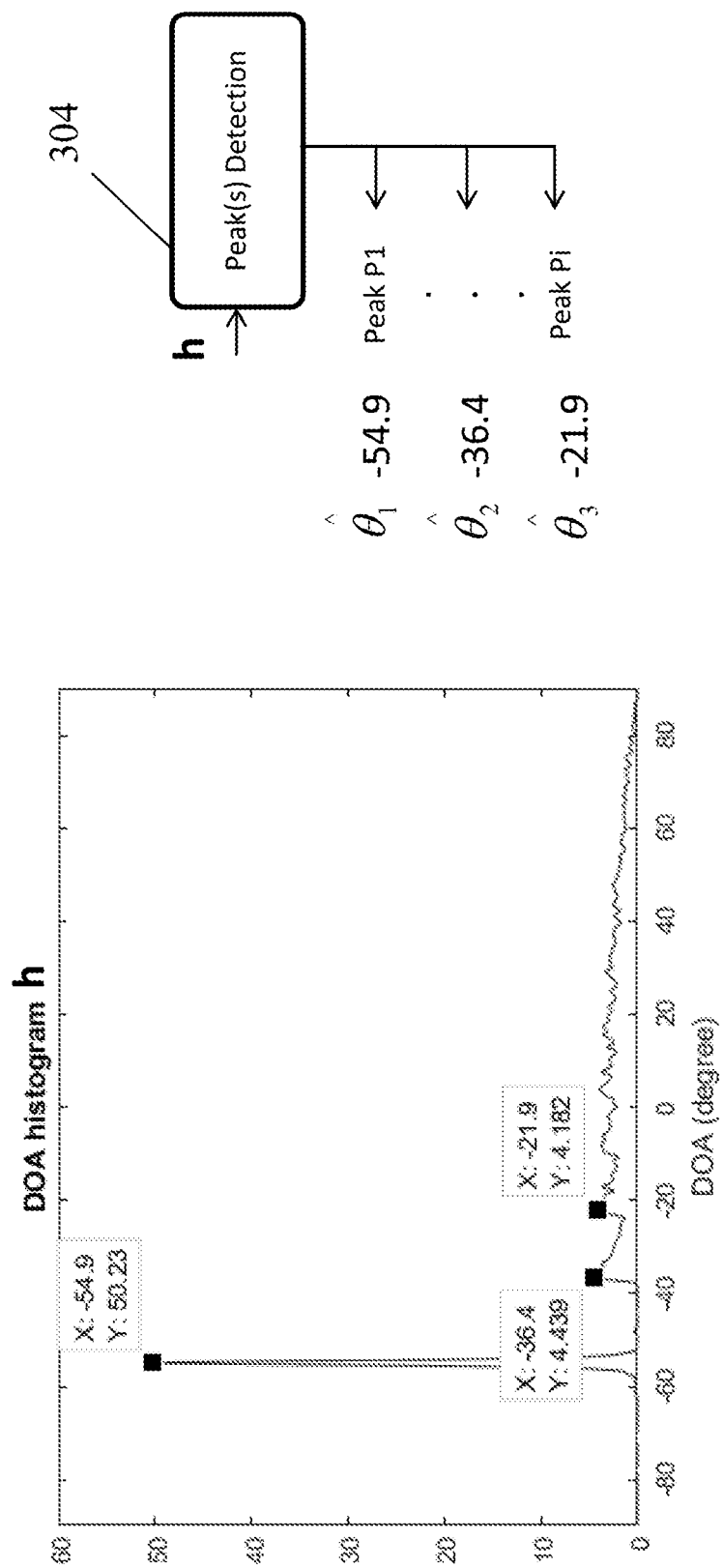
FIG. 7 shows technical details of a device according to an embodiment of the invention.

This is shown in FIG. 7, which illustrates in more detail the detecting of peaks in the histogram h at box 304. FIG. 7 shows specifically on the left-hand side, that in this case the (correct) peak at −54.9°, and two further peaks at −36.4° and −21.9°, respectively, are detected (wherein Q=1, and q=2). Then, further post-processing (specifically one or more masking steps) may be applied to preserve the correct peaks and to attenuate the peaks resulting from $\ddot{\theta}$.

Figure 8:
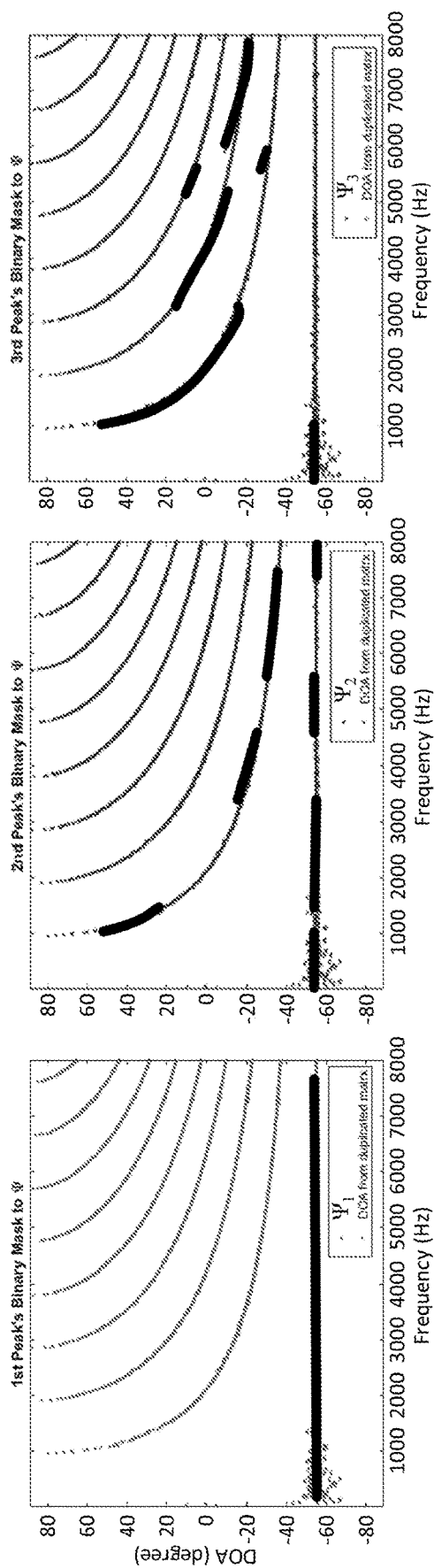
FIG. 8 shows technical details of a device according to an embodiment of the invention.
Figure 8:
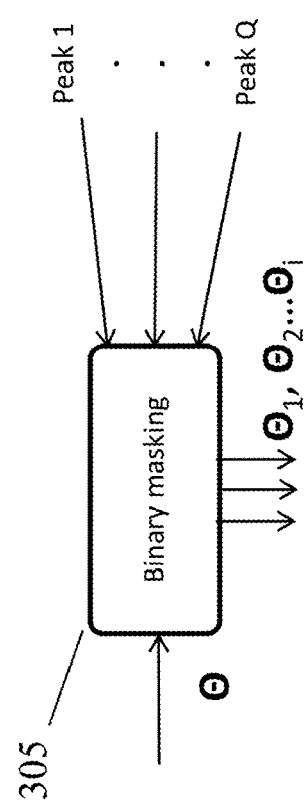
Figure 9:
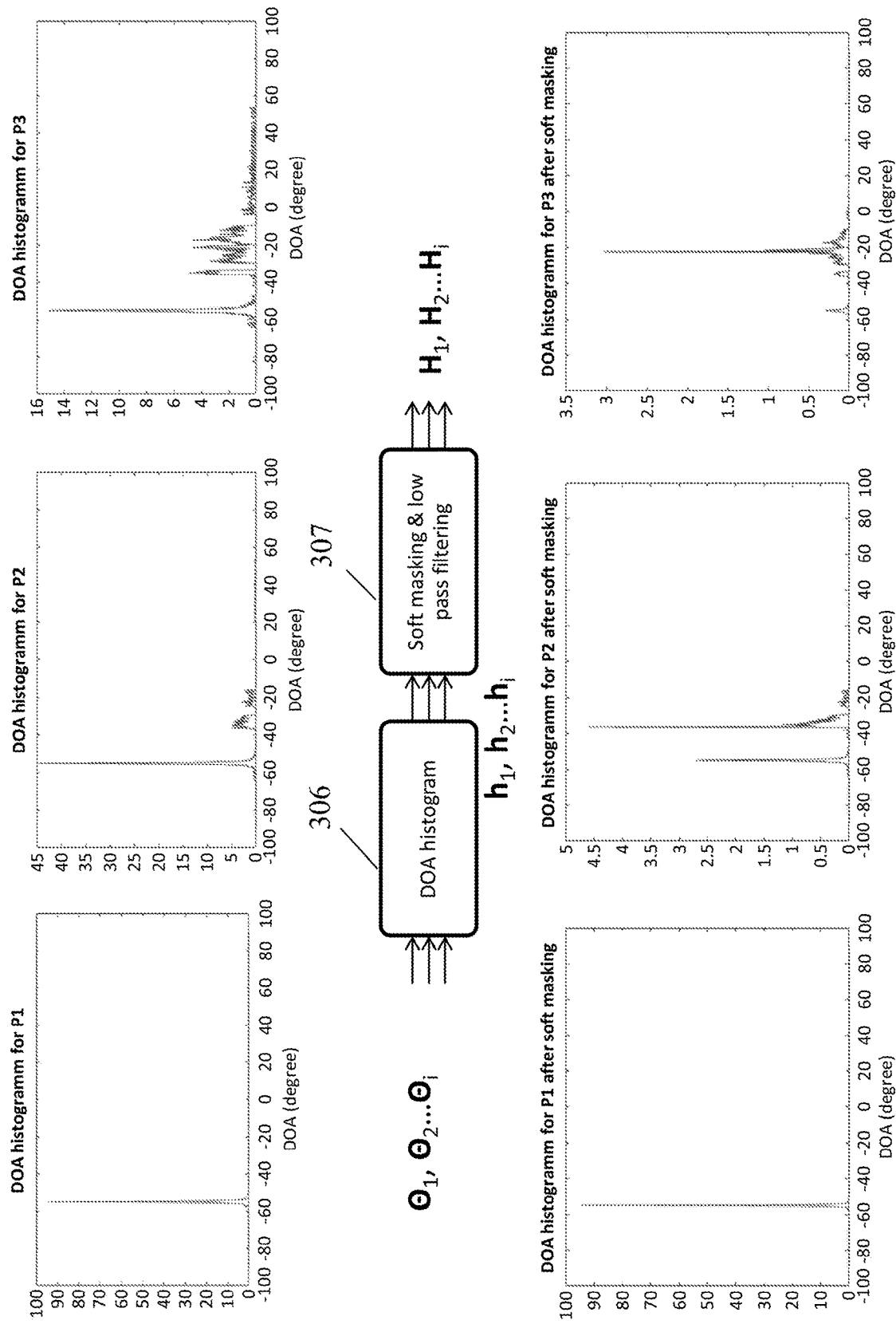
FIG. 9 shows technical details of a device according to an embodiment of the invention.

FIG. 8 shows particularly in more detail the binary masking carried out at box 305. FIG. 9 shows in more detail the soft masking carried out at box 307.

To evaluate, whether the chosen peaks (DOA candidates) correspond to actual sound sources 202, and not aliasing peaks, each of the peaks is processed individually. The position of a $k^{th}$ peak is denoted as $p_k$, and from equation (3), the corresponding aliasing frequency can be determined as $f_{a_k}$.

With these frequency indexes, binary masks can be applied to select the DOA values of the phases in supposed correct sinusoidal periods for the corresponding peaks from θ. The process of selecting the related DOA values for a peak value may be described as $$\theta_k(i) = \theta\left(i, \left\lfloor \frac{f_{a_k} - f_i}{2f_i} \right\rfloor\right) \quad (10)$$

$$i = 1, \ldots, N$$

where $\theta_k$ includes the $k^{th}$ peak and its related DOA values.

FIG. 8 shows the results of such binary masking. In particular, FIG. 8 shows (on the top-side) frequency dependent DOA values in a graph for each of the selected peaks (here the three peaks at −54.9°, −36.4° and −21.9° were selected, see FIG. 7). The DOA values along the bold values are the related DOA values of the respective peak (DOA candidate).

$\theta_k$ of each peak is then transformed into a histogram $h_k$. That is a histogram $h_k$ is generated for the $k^{th}$ selected DOA candidate and its related DOA values, as is shown in FIG. 9 (on its top-side). In particular, FIG. 9 shows the three histograms for each of the selected DOA candidates, i.e. histograms corresponding to the respectively selected peaks and their corresponding DOA values. As shown in FIG. 8, for the first peak at −54.9° only DOA values on a horizontal line were related. Thus, there is only one sharp histogram peak.

A soft mask $M_k$ may now be applied to the histogram $h_k$ related to the $k^{th}$ peak, in order to highlight the correct peaks. The mask may be the same or different for each peak. FIG. 9 shows in this respect (on its bottom-side) more details of the soft masking applied at box 307. The soft masking may be optionally combined with a low pass filtering. The histograms $H_1, H_2 \ldots H_i$ shown on the bottom-side of FIG. 9 are after applying the soft mask to the respective histograms $h_1, h_2 \ldots h_i$ on the top-side. It can be seen that the peaks corresponding to the selected DOA candidates are enhanced in the soft-masked histograms.

Theoretically, the width of an aliasing peak is large. In contrast, the width of a correct peak $p_k$ is narrow at 0°, and increases when the peak is getting closer to ±90°. With this property, the soft mask may be designed as a peak filter with small width at 0° and large width at +90°. A practical soft mask with respect to the $k^{th}$ selected DOA candidate can preferably be designed like $$M_k(i) = \frac{2p_k}{|2i - N_h - 2p_k|\arcsin\sqrt{\left(\frac{1}{f_{ak0}} - \frac{1}{f_{nh}}\right)\frac{c}{\Delta d}}}, \quad (11)$$

$$i = 1, \ldots, N_h$$

where $f_{nh}$ denotes the considered highest frequency.

The soft masking is preferably applied by Schurproduct (°) according to $$H_k = h_k \circ M_k \quad (12)$$

Figure 10:
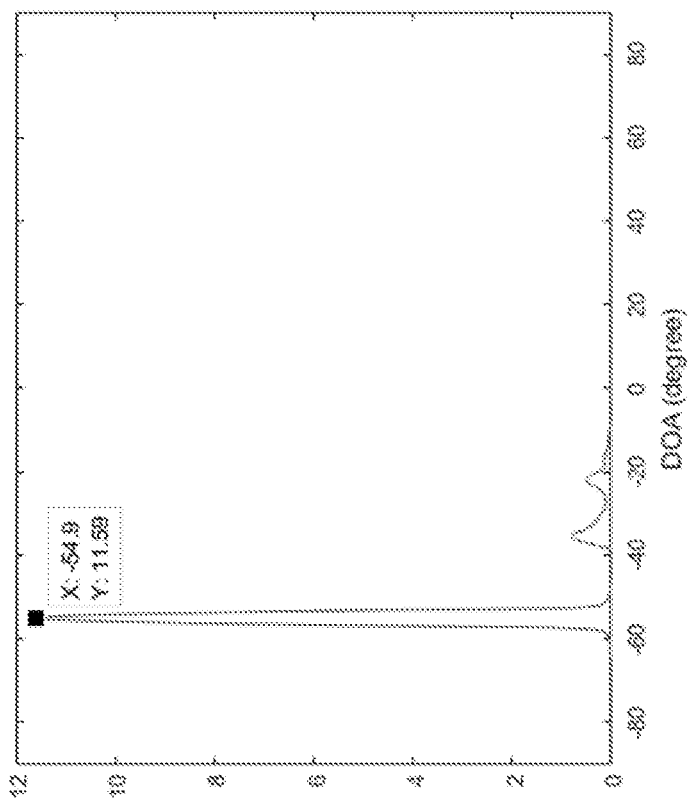
FIG. 10 shows technical details of a device according to an embodiment of the invention.
Figure 10:
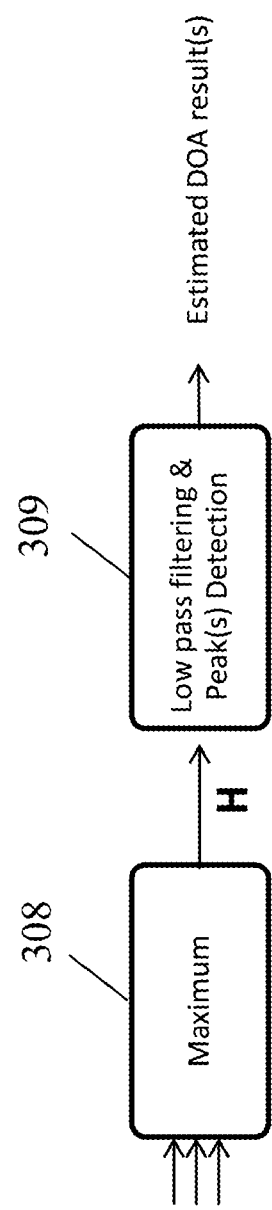
Figure 11:
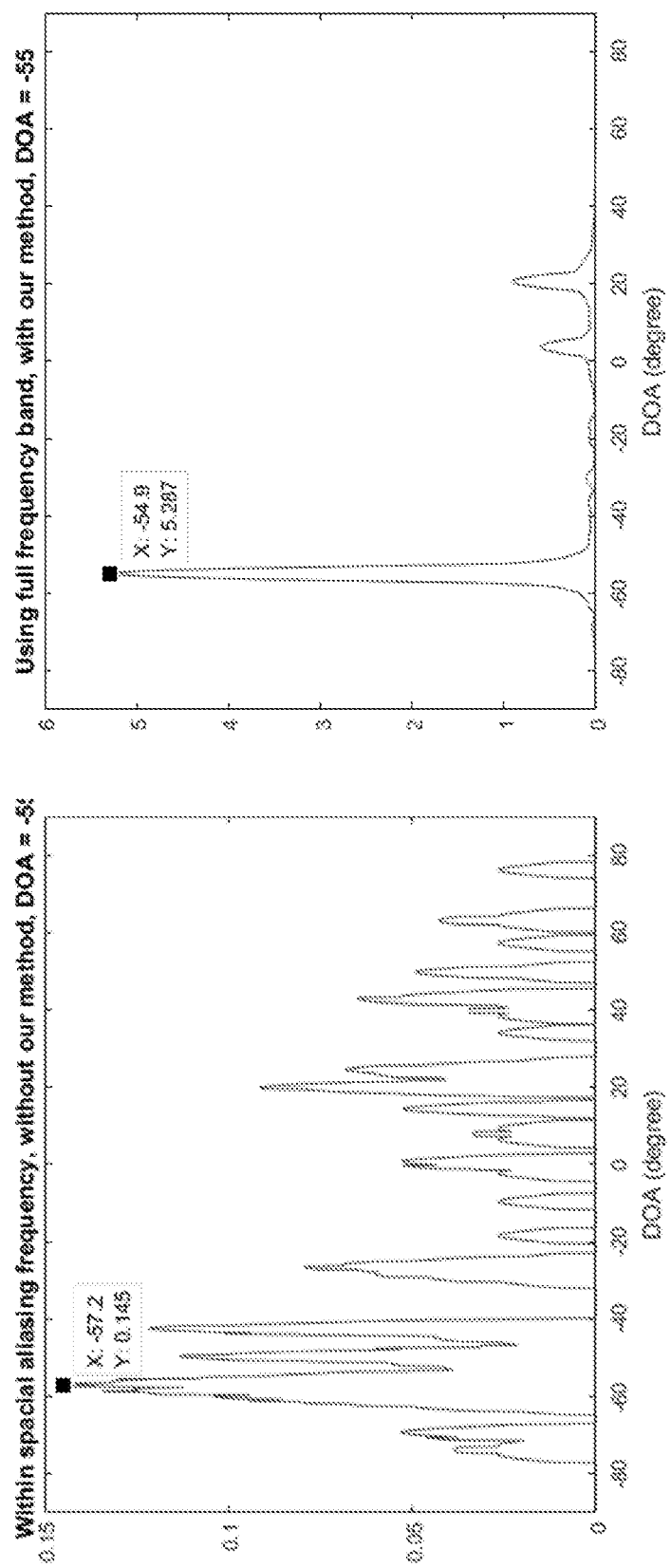
FIG. 11 shows a comparison between a DOA histogram produced by a device according to an embodiment of the invention and a conventional device.

FIGS. 10 and 11 show in more detail the merging of the third histograms $H_1, H_2 \ldots H_i$ into the second histogram H at box 308, and also the final low-pass filtering applied to the histogram H and the estimation of DOA results at box 309.

The masked histograms from the peak candidates are merged to H by "maximum" according to $$H(i) = \max(H_1(i), \ldots, H_k(i), \ldots H_Q(i)) \quad (13)$$

FIG. 10 shows the merged DOA histogram H.

A low-pass filter is preferably further applied to this histogram H, more preferably Gaussian filter. Even more preferably, a Gaussian filter is suggested to be applied with a standard deviation a equal to the lowest localization resolution of the microphone setup. The reason to set this deviation is to balance the height of the peaks closer to 0° and 90°. Theoretically, the widths of the aliasing peaks are large while the widths of the correct peaks are narrow at 0°, and the widths of the correct peaks increase when the peaks are getting closer to ±90°. Therefore using the soft-mask in this way can help to detect the correct peaks more reliably. A simplified equation to obtain the lowest resolution is given as $$\sigma = \arccos\left(1 - \frac{c}{f_s \Delta d}\right)$$

where $f_s$ denotes the sampling rate.

Finally, Q peaks are selected by their peak prominence from the (optionally low-pass filtered) histogram H. The positions of the peaks are the DOA result output by the device 100.

Figure 12:
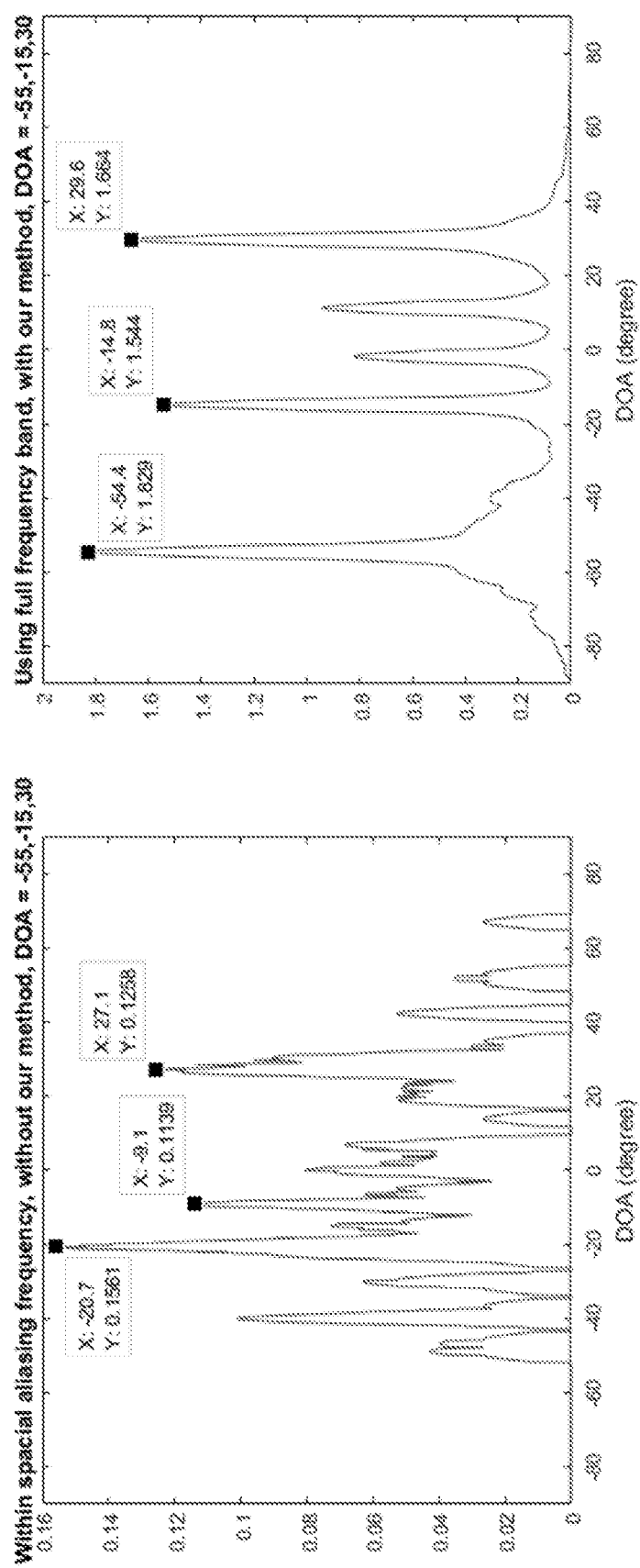
FIG. 12 shows a comparison between a DOA histogram produced by a device according to an embodiment of the invention and a conventional device.
Figure 13:
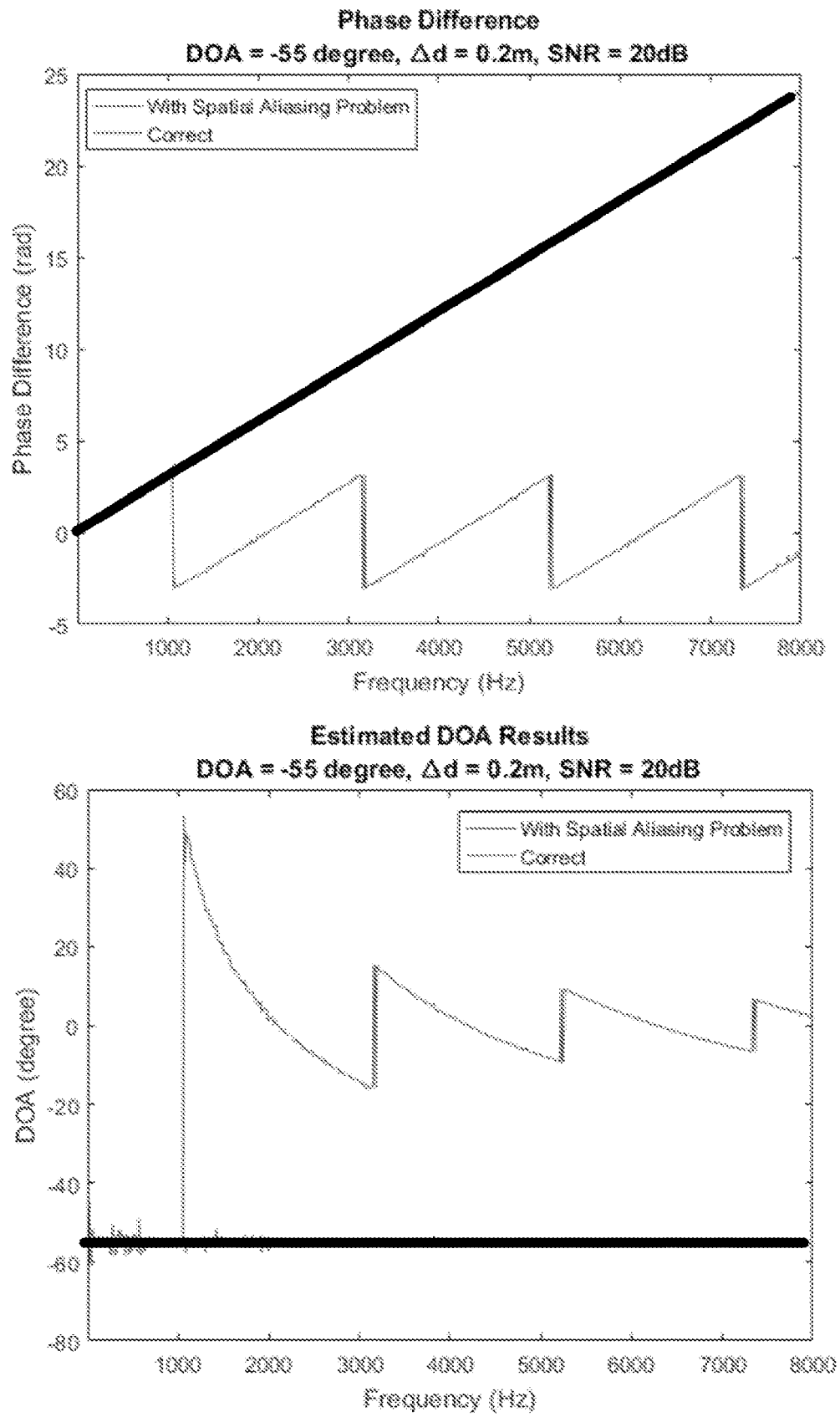
FIG. 13 illustrates a spatial aliasing problem.

FIGS. 11 and 12 compare in this respect the histogram H of the device 100 with a histogram generated by a conventional device. FIG. 11 shows in particular the histogram of the conventional device for a sound source DOA of about −55° (Q=1) on the left-hand side, and the corresponding histogram H generated by the device 100 on the right-hand side. FIG. 12 shows further a histogram of a conventional device for multiple sound source DOAs of about −55°, −15° and 30° (Q=3) on the left-hand side, and the corresponding histogram H of the device 100 on the right-hand side. It can be seen that the peak at the correct DOA is much cleaner and much more pronounced in the histogram H produced by the device 100. Accordingly, the estimation of θ will be more accurate and robust, especially in noisy environments.

As a consequence, the device 100 of embodiments of the invention enhances the robustness and accuracy of sound source localization that uses microphones or microphone arrays, especially when the distance between the microphones is large. A potential application for such a device 100 or for the apparatus 200 is, for example, in a distance speech pick up device, in a tablet, in a mobile phone, or in a teleconference device. In each application, the invention specifically reduces or eliminates the negative spatial aliasing effects.

The invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items described.

What is claimed is:

1. A device for estimating Direction of Arrival (DOA) of sound from Q >1 sound sources, the device being a component in a system comprising a plurality of microphone units, the device being configured to:
   obtain a phase difference matrix including measured phase difference values, each of the measured phase difference values being a measured value of a phase difference between two microphone units of the plurality of microphone units for a frequency bin in a range of frequencies of the sound, generate a replicated phase difference matrix by replicating the measured phase difference values to other potential sinusoidal periods, calculate a DOA value for each phase difference value in the replicated phase difference matrix, generate a first histogram from the calculated DOA values, select, as Q+q DOA candidates, Q+q most prominent peak values in the first histogram, wherein q=2, generate a second histogram based on the selected Q+q DOA candidates, and determine, as Q DOA results, Q most prominent peak values in the second histogram.

2. The device according to claim 1, wherein the device is further configured to:

generate the replicated phase difference matrix by replicating the measured phase difference values based on a minimum aliasing frequency defined by $$f_{a0} = \frac{c}{2\Delta d}$$

wherein $\Delta d$ denotes a distance between the two microphone units and c is a speed of the sound.

3. The device according to claim 2, wherein:

the measured phase difference values in the phase difference matrix are wrapped into $[-\pi, \pi]$, and the device is configured to generate the replicated phase difference matrix according to $$C = \left\lceil \frac{f_i - f_{a_0}}{2f_{a_0}} \right\rceil$$

$$C_s = (-C, -C+1, \ldots, 0, \ldots, C)$$

$$\mu(i, j) = \mu_0(i) + 2\pi C_s(j)$$

$$i = 1, \ldots N; j = 1, \ldots (2C+1)$$

wherein $\mu_0$ denotes the phase difference matrix, $\mu$ denotes the replicated phase difference matrix, i is a frequency bin index corresponding to frequency $f_i$, j is a replication index, and [*] denotes a ceiling function.

4. The device according to claim 3, wherein the device is further configured to:

calculate the DOA values based on the formula $$\theta(i, j) = \arcsin \frac{\mu(i, j)}{2\pi f \Delta d}$$

wherein $\theta(i,j)$ denotes the DOA value for frequency bin index i and replication index j, $\mu$ denotes the replicated phase difference matrix and $\Delta d$ denotes a distance between the two microphone units.

5. The device according to claim 1, wherein the device is further configured to:

remove complex calculated DOA values, before generating the first histogram.

6. The device according to claim 1, wherein, for generating the second histogram, the device is configured to:

determine, for each selected DOA candidate, its related DOA values from the calculated DOA values, generate third histograms from each selected DOA candidate and its related DOA values, and generate the second histogram by merging the third histograms of all selected DOA candidates.

7. The device according to claim 6, wherein the device is further configured to:

merge the third histograms of all selected DOA candidates to generate the second histogram by, for each histogram index, using the maximum value from all the third histograms as the value of the second histogram for that histogram index.

8. The device according to claim 6, wherein the device is further configured to:

determine the related DOA values of a DOA candidate by determine, as its related phase difference values, the phase difference values in the replicated phase difference matrix that are in supposed correct sinusoidal periods, and calculate its related DOA values from its related phase difference values.

9. The device according to claim 6, wherein the device is further configured to:

apply a soft mask to the peak values in each of the third histograms, before merging the third histograms into the second histogram, wherein the soft mask is designed as a peak filter with a smaller width at a DOA of 0° and larger widths at DOAs of ±90°.

10. The device according to claim 9, wherein the device is further configured to:

apply a low-pass filter to the second histogram, before determining the Q DOA results.

11. The device according to claim 1, wherein:

each microphone unit of the two microphone units includes an array of one or more microphones, and the one or more measured phase difference values of the phase difference matrix are obtained from measured phase differences between the one or more microphones of one of the microphone units and the one or more microphones of the other one of the microphone units.

12. An apparatus for determining Direction of Arrival (DOA) of sound from Q>1 sound sources, the apparatus comprising:

a device configured to:

obtain a phase difference matrix including measured phase difference values, each of the measured phase difference values being a measured value of a phase difference between two microphone units of a plurality of microphone units for a frequency bin in a range of frequencies of the sound, generate a replicated phase difference matrix by replicating the measured phase difference values to other potential sinusoidal periods, calculate a DOA value for each phase difference value in the replicated phase difference matrix, generate a first histogram from the calculated DOA values, select, as Q+q DOA candidates, Q+q most prominent peak values in the first histogram, wherein q=2, generate a second histogram based on the selected Q+q DOA candidates, and determine, as Q DOA results, Q most prominent peak values in the second histogram and a sound receiver, including the two microphone units, configured to receive the sound, generate the phase difference matrix, and provide the phase difference matrix to the device.

13. A method of estimating Direction of Arrival (DOA) of sound from Q >1 sound sources, in a system comprising a plurality of microphone units, the method comprising:
obtaining a phase difference matrix including measured phase difference values, each of the measured phase difference values being a measured value of a phase difference between two microphone units of the plurality of microphone units for a frequency bin in a range of frequencies of the sound,
generating a replicated phase difference matrix by replicating the measured phase difference values to other potential sinusoidal periods,
calculating a DOA value for each phase difference value in the replicated phase difference matrix,
generating a first histogram from the calculated DOA values,
selecting, as Q+q DOA candidates, Q+q most prominent peak values in the first histogram, wherein q=2,
generating a second histogram based on the selected Q+q DOA candidates, and
determining, as Q DOA results, Q most prominent peak values in the second histogram.

14. The device according to claim 10, wherein the low-pass filter is a Gaussian filter with a standard deviation σ according to $$\sigma = \arccos\left(1 - \frac{c}{f_s \Delta d}\right)$$

wherein $f_s$ denotes the sampling rate.

15. The apparatus according to claim 12, wherein the device is further configured to:
generate the replicated phase difference matrix by replicating the measured phase difference values based on a minimum aliasing frequency defined by $$f_{a0} = \frac{c}{2\Delta d}$$

wherein $\Delta d$ denotes a distance between the two microphone units and c is a speed of the sound.

16. The apparatus according to claim 15, wherein:
the measured phase difference values in the phase difference matrix are wrapped into $[-\pi, \pi]$, and the device is configured to generate the replicated phase difference matrix according to $$C = \left\lceil \frac{f_i - f_{a_0}}{2f_{a_0}} \right\rceil$$

$$C_s = (-C, -C+1, \ldots, 0, \ldots, C)$$

$$\mu(i, j) = \mu_0(i) + 2\pi C_s(j)$$

$$i = 1, \ldots N; j = 1, \ldots (2C+1)$$

wherein $\mu_0$ denotes the phase difference matrix, μ denotes the replicated phase difference matrix, i is a frequency bin index corresponding to frequency $f_i$, j is a replication index, and [*] denotes a ceiling function.

17. The method according to claim 13, further comprising:
generating the replicated phase difference matrix by replicating the measured phase difference values based on a minimum aliasing frequency defined by $$f_{a0} = \frac{c}{2\Delta d}$$

wherein $\Delta d$ denotes a distance between the two microphone units and c is a speed of the sound.

18. The method according to claim 17, wherein:
the measured phase difference values in the phase difference matrix are wrapped into $[-\pi, \pi]$, and the method further comprises:
generating the replicated phase difference matrix according to $$C = \left\lceil \frac{f_i - f_{a_0}}{2f_{a_0}} \right\rceil$$

$$C_s = (-C, -C+1, \ldots, 0, \ldots, C)$$

$$\mu(i, j) = \mu_0(i) + 2\pi C_s(j)$$

$$i = 1, \ldots N;$$

$$j = 1, \ldots (2C+1)$$

wherein $\mu_0$ denotes the phase difference matrix, μ denotes the replicated phase difference matrix, i is a frequency bin index corresponding to frequency $f_i$, j is a replication index, and [*] denotes a ceiling function.

* * * * *

UNITED STATES PATENT AND TRADEMARK OFFICE
CERTIFICATE OF CORRECTION

| | |
|---|---|
| PATENT NO. | : 11,567,162 B2 |
| APPLICATION NO. | : 16/664373 |
| DATED | : January 31, 2023 |
| INVENTOR(S) | : Chen et al. |

It is certified that error appears in the above-identified patent and that said Letters Patent is hereby corrected as shown below:

In the Claims

Claim 8: Column 14, Line 18: "determe, as its related phase difference values, the phase" should read -- determine, as its related phase difference values, the phase --.

Signed and Sealed this
Sixth Day of June, 2023

Katherine Kelly Vidal
*Director of the United States Patent and Trademark Office*